(12) United States Patent
Gelonese

(10) Patent No.: US 8,190,940 B2
(45) Date of Patent: May 29, 2012

(54) PERSONAL COMPUTER POWER CONTROL METHOD AND DEVICE

(75) Inventor: Giuseppe Antonio Gelonese, Para Hills (AU)

(73) Assignee: Embertec Pty Ltd, Dulwich, S.A. (AU)

( * ) Notice: Subject to any disclaimer, the term of this patent is extended or adjusted under 35 U.S.C. 154(b) by 343 days.

(21) Appl. No.: 12/524,709

(22) PCT Filed: Dec. 27, 2007

(86) PCT No.: PCT/AU2007/002009
§ 371 (c)(1),
(2), (4) Date: Dec. 18, 2009

(87) PCT Pub. No.: WO2008/077198
PCT Pub. Date: Jul. 3, 2008

(65) Prior Publication Data
US 2010/0095146 A1    Apr. 15, 2010

(30) Foreign Application Priority Data
Dec. 27, 2006    (AU) .................................. 2006907168

(51) Int. Cl.
*G06F 1/32*    (2006.01)
(52) U.S. Cl. ........................ 713/324; 307/39; 713/323

(58) Field of Classification Search ............... 307/39; 713/323, 324
See application file for complete search history.

(56) References Cited

U.S. PATENT DOCUMENTS
6,092,209 A      7/2000  Holzhammer et al.
7,132,763 B2 *  11/2006  Rendic ............................. 307/31
7,380,142 B2 *   5/2008  Lee et al. ........................ 713/300

FOREIGN PATENT DOCUMENTS
EP         1657623 A1      5/2006
WO     WO 03/062973 A1    7/2003
* cited by examiner

*Primary Examiner* — Albert Wang
(74) *Attorney, Agent, or Firm* — Novak Druce + Quigg LLP

(57) ABSTRACT

The present invention describes a method for controlling electrical power supply to a personal computer installation, which may have a number of peripheral devices attached, such as printers, monitors etc. The method includes providing a first controlled power outlet adapted for supplying electrical power to a plurality of first devices and then monitoring, by use of software running on a personal computer, usage of at least one input device of the personal computer as well as a processor(s) associated with the computer, as well as the power level and power usage and then when the power usage mode is determined to be such that the first devices are not required to be powered, controlling the first controlled switch to remove power from the first controlled power outlet.

6 Claims, 2 Drawing Sheets

PERSONAL COMPUTER POWER CONTROL METHOD AND DEVICE

CROSS-REFERENCE TO RELATED APPLICATIONS

This application is a §371 national stage entry of International Application No. PCT/AU2007/002009, filed Dec. 27, 2007, which claims priority to Australian Application No. 2006907168, filed Dec. 27, 2006, both of which are incorporated herein in their entirety by reference.

TECHNICAL FIELD

This invention relates to the control of the supply of electrical power to plug-in electrical equipment, in particular to the control of the supply of electrical power to groups of such electrical equipment where the power supply requirement of these groups is related to the operational status of a main piece of electrical equipment. More particularly it relates to the provision of electrical power to peripheral devices in a personal computer installation.

BACKGROUND ART

A desktop computer installation typically has associated with it a number of peripheral devices and other associated electrical devices, each of which is separately electrically powered. The peripheral devices can include such things as printers, scanners and modems or there may be associated devices such as a desk lamp or a room heater.

These peripheral devices and associated electrical equipment are in general not used when the computer is not in use. However, because they are separately electrically powered the user must, when turning off the computer, also turn off each of the peripheral and associated devices. This is a time consuming process and indeed given the placement of the power switches on many such electrical devices, may be extremely inconvenient.

It is also the case that widely used computer operating systems require significant time to perform certain "housekeeping" tasks in between receiving command to shut down and actually shutting off the power or being in a position to have the power supply to the computer shut off without causing problems for the computer system. During this time, the computer system also may not tolerate having power removed from peripheral devices.

Accordingly many users simply leave the additional devices powered on after the computer has been shut down. This is not ideal for a number of reasons. The first of these is that the devices continue to consume power which is both costly and a waste of resources. This is particularly a problem since many modern devices use small plug-in transformers to provide the lower operating voltages which they require. These plug-in transformers continue to consume power whilst they are connected to a mains supply even if the power switch on the device which they are supplying with power has been switched off.

It is also the case that all electrical devices have a finite life span of operation and this life span can be made to extend over a longer period of time if the device is switched off when not in use.

It is also advantageous that mains power be removed from devices when not required in order to reduce the possibility of exposure to damaging surges in the mains power supply.

Prior art devices have attempted to deal with this problem by providing relays which cut off power to peripheral devices when no current is flowing to the main device, the main device being the desktop computer itself.

However, most modern desktop computers have the ability to control their power usage to some extent by entering one or more lower power consumption states, usually referred to as standby states. Users may allow the device to spend extended periods in such a standby state, negating most of the advantages of the prior art devices.

DISCLOSURE OF THE INVENTION

In one form of the invention, although this need not be the only or the broadest form it may be said to lie in a method for controlling electrical power supply to a personal computer installation including the steps of:
providing a first controlled power outlet having a first controlled switch adapted for supplying electrical power to a plurality of first devices;
monitoring by use of software running on a personal computer usage of at least one input device of the personal computer;
monitoring by use of software running on the personal computer usage of at least one processor of the personal computer;
monitoring by use of software running on the personal computer a power level mode of the personal computer;
analyzing the results of said monitoring to determine at least one power usage mode of the personal computer; and
where the power usage mode is determined to be such that the first devices are not required to be powered, controlling the first controlled switch to remove power from the first controlled power outlet.

In preference the method further includes the steps of providing a second controlled power outlet adapted for supplying electrical power to a plurality of second devices where the power usage mode is such that the second devices are not required to be powered, controlling the second controlled switch to remove power from the second controlled power outlet.

In preference the method further includes the steps of providing means to control a supply of mains electricity to a power supply of the personal computer and operating said means such that when both first and second controlled switches are controlled to be off, the supply of mains electricity is removed from the personal computer power supply.

In a further embodiment, the invention may be said to lie in an electrical power supply control device for a personal computer installation including:
a first controlled power outlet adapted for supplying electrical power to a plurality of first devices, said power outlet being controlled by a first switch;
software running on a personal computer adapted to monitor usage of at least one input device of the personal computer;
software running on a personal computer adapted to monitor usage of at least one processor of the personal computer;
software running on a personal computer adapted to monitor a power level mode of the personal computer;
the software being adapted to analyze the results of said monitoring to determine at least one power usage mode of the personal computer; and
means adapted to control the first switch such that when the power usage mode is determined to be such that the first devices are not required to be powered, the first switch is operated to remove power from the first controlled power outlet.

In preference, there is a second controlled power outlet adapted for supplying electrical power to a plurality of second devices said power outlet being controlled by a second switch:

means adapted to control the second switch such that when the power usage mode is determined to be such that the second devices are not required to be powered, the second switch is operated to remove power from the second controlled power outlet.

In preference there is means to control a supply of mains electricity to a power supply of the personal computer said means being operated such that when both first and second controlled switches are controlled to be off, the supply of mains electricity is removed from the personal computer power supply.

BRIEF DESCRIPTION OF DRAWINGS

Turning now to FIG. 1, there is depicted the case 100 of a personal computer. The personal computer includes a conventional PC power supply 102, which is connected to the mains power by a conventional power supply mains switch 101.

Figure 1:
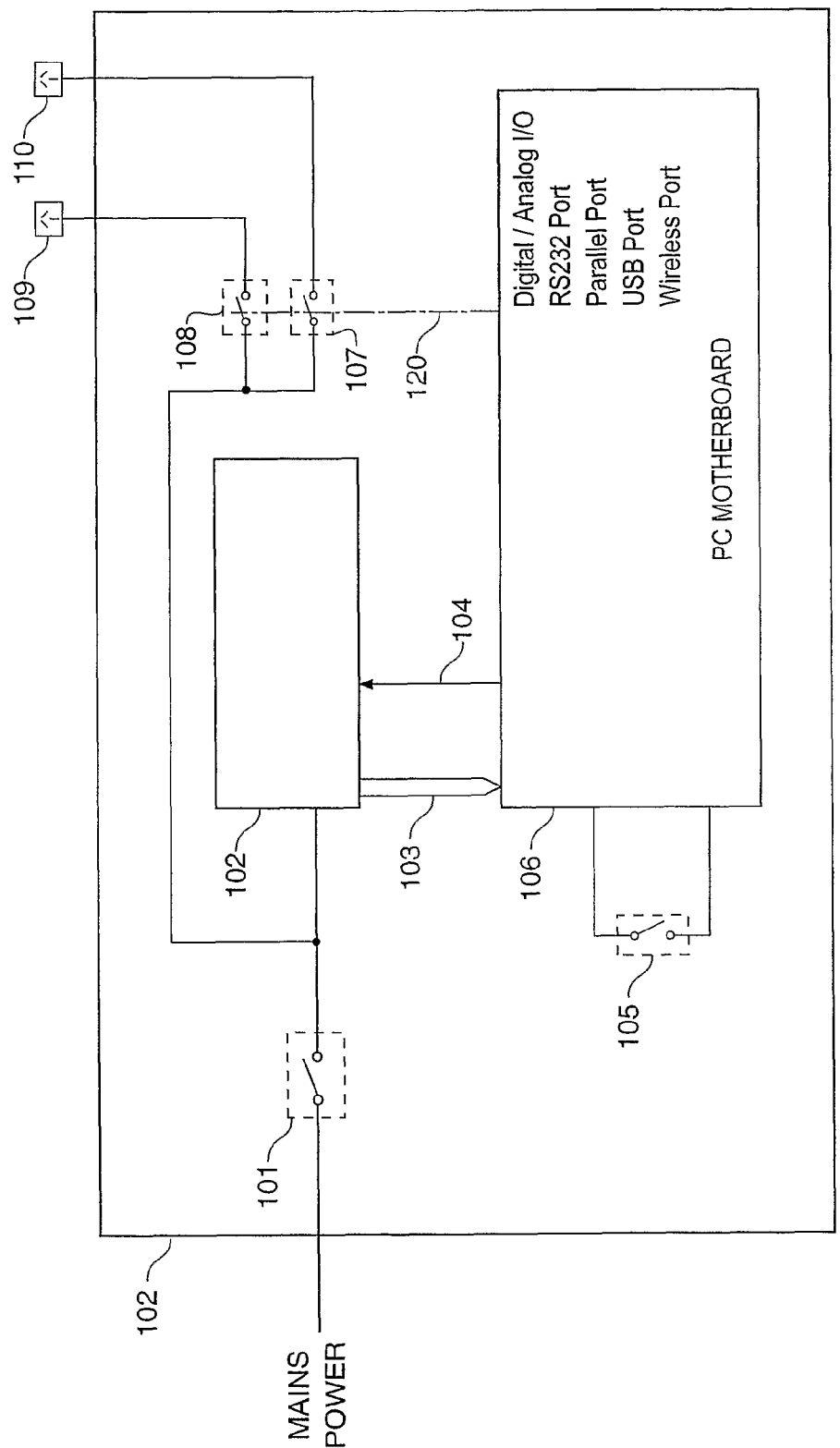
FIG. 1 is a block diagram of a personal computer including a personal computer power control device of the invention.

The power supply provides power to the circuitry of the personal computer including providing power to the PC motherboard via power line 103.

In this embodiment, the PC motherboard includes a control line 104, which allows signal communication between the PC motherboard and the PC power supply. Other embodiments would not include this control line.

A PC power switch 105 is provided which communicates to the PC motherboard. This allows a user to switch the PC on and off by manipulation of the switch 105, but with the physical response to that switch being controlled by the PC motherboard via its control of the PC power supply 102 via control line 104.

There is provided an external general purpose outlet 109, the power supply to which is controlled by switch 108. This outlet and devices powered from this outlet will be referred to as circuit 1.

There is also provided a second general purpose outlet 110, the power supply to which is controlled by switch 107. This outlet and the devices powered from it will be referred to as circuit 2.

The general purpose outlets may be provided mounted on the PC case 100 or they may alternatively may be provided at the end of a flexible cord running from the PC case.

In use, peripheral and external devices which require power only when the computer is actually in use are powered from circuit 1. Devices which require power at any time except when the computer is actually switched off have their power provided via circuit 2.

The switches 107 and 108 are controlled by software running on the personal computer by means of control line 120. This control line may consist of individual digital input-output lines for each switch. These may be dedicated input-output lines or they may be provided via any conventional output port, such as an RS232 port, parallel port, or a USB port.

Alternatively, the switches 107 and 108 may include a digital data interpretation circuitry and the control line may provide a digital data train indicating the required state of the switches 107 and 108.

The required state of the switches 107 and 108 is determined by software running on the personal computer or on a dedicated separate processor.

Figure 2:
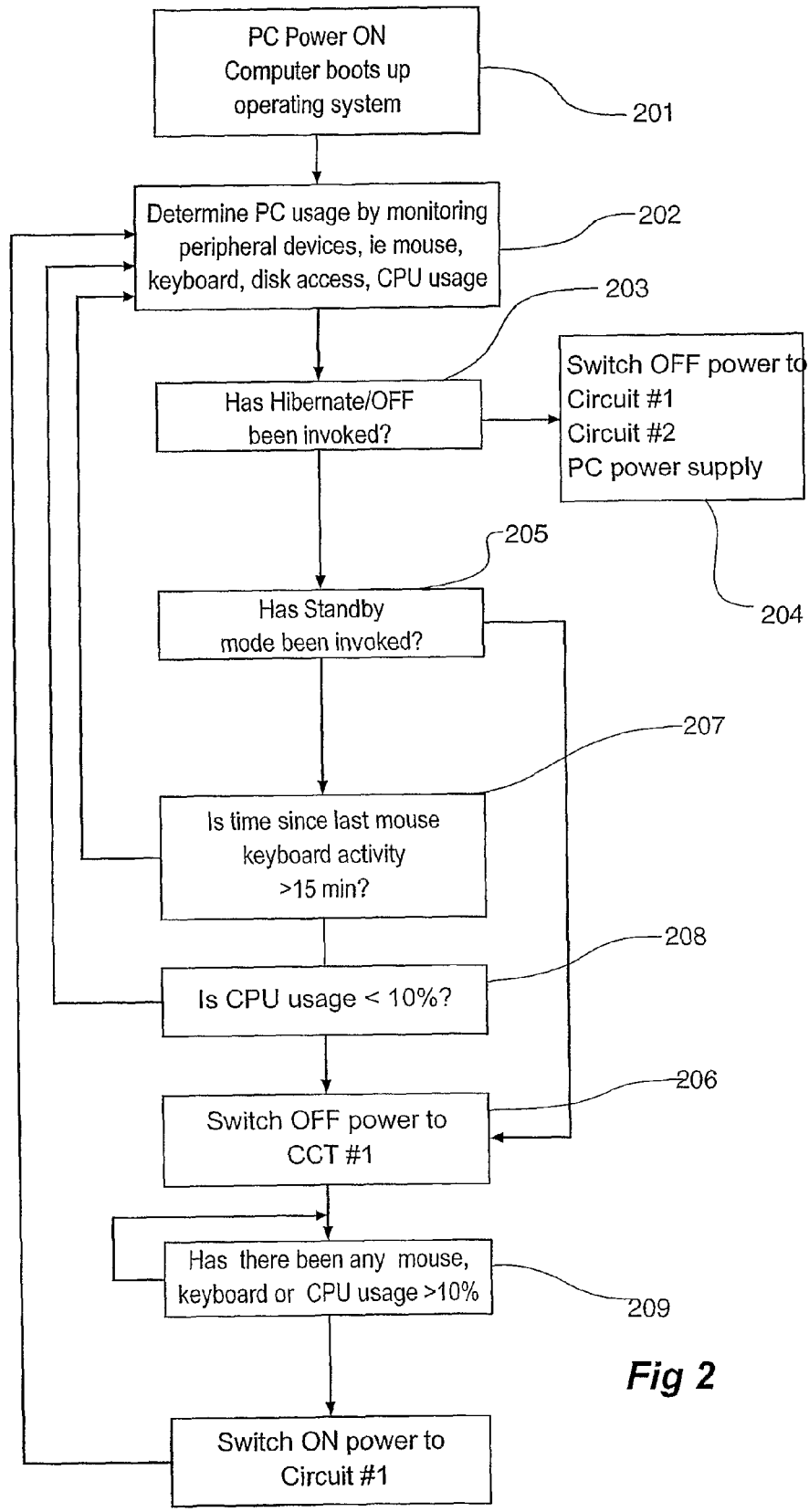
FIG. 2 is a flow chart of the software implementing the method of the invention.

A flowchart depicting the main steps of the software process is shown in FIG. 2.

At PC power-up 201, a power usage monitoring process 202 is launched.

The process 202 monitors use of the mouse and keyboard. It also monitors CPU usage and may monitor disk access.

Typically, personal computers are capable of having multiple power level mode. A PC may enter a power level mode called stand-by mode when there has been no user activity for some time. In this mode some functions are suspended and/or power is withdrawn from some parts of the computer. This reduces the power used by the computer. They are also typically capable of entering a power level mode called hibernate mode when this inactivity continues for a longer period of time. This mode typically suspends almost all computer activity, reducing the power usage still further.

The operating system is capable of communicating these changes of state to software running on the computer. The software process therefore includes the decision point 203 wherein if the hibernate mode has been invoked by the computer or the PC power switch 105 has been operated to off. This indicates that the PC has entered a no power usage mode. The process 204 is activated to remove power from both circuit 1 and circuit 2 and also optionally from the PC power supply itself.

Where this has not occurred, the process then continues to check 205 whether the standby mode has been invoked. This indicates that a standby usage mode has been entered. If this is the case, then a process 206 is invoked to remove power from circuit 1 by the operation of switch 108.

Where this has not occurred, the process then checks 207 to see if mouse or keyboard activity has been recorded in a pre-defined preceding time period. In this case, the time period is 15 minutes.

If this is the case, it is not possible to assume that the computer is unused. It may be in use, but not have required keyboard or mouse interaction. Therefore, there is a check 208 to see if the CPU usage of the computer is above a pre-defined level. In this case, the level is set at 10%. If the level is above 10% then the process returns to its monitoring state 202.

If the CPU usage is less than 10%, this indicates that a standby usage mode has been entered. The process 206 is then activated to remove power from circuit 1.

Where the process has removed power from circuit 1, a process 209 remains active, checking for mouse of keyboard activity or for the CPU usage to rise to greater than 10%. When this occurs, power is returned to circuit 1 and the process returns to its monitoring state 202.

In use, this method ensures that when the computer is in stand-by mode, or is simply unused for an extended period, a standby usage mode will be identified and power is removed from those devices connected to circuit 1. These devices will be devices which require power only when the computer is being actively used.

When the computer enters a hibernate stage or is turned off, a no power usage mode is identified. Power is removed from circuit 1 and circuit 2. The devices connected to circuit 2 will be devices, which require power at any time when the computer is switched on.

The process controls the power to circuit 1 and circuit 2 via switches 107 and 108 as described in the description of FIG. 1.

Although the invention has been herein shown and described in what is conceived to be the most practical and preferred embodiment, it is recognised that departures can be made within the scope of the invention, which is not to be limited to the details described herein but is to be accorded the full scope of the appended claims so as to embrace any and all equivalent devices and apparatus.

The invention claimed is:

1. A method for controlling electrical power supply to a personal computer installation including the steps of:
    a. providing a first controlled power outlet having a first controlled switch adapted for supplying electrical power to a plurality of first devices;
    b. monitoring by use of software running on a personal computer usage of at least one input device of the personal computer;
    c. monitoring by use of software running on the personal computer usage of at least one processor of the personal computer;
    d. monitoring by use of software running on the personal computer a power level mode of the personal computer;
    e. analyzing the results of said monitoring to determine at least one power usage mode of the personal computer; and
    f. where the power usage mode is determined to be such that the first devices are not required to be powered, controlling the first controlled switch to remove power from the first controlled power outlet.

2. The method of claim 1 further including providing a second controlled power outlet adapted for supplying electrical power to a plurality of second devices where the power usage mode is such that the second devices are not required to be powered, controlling the second controlled switch to remove power from the second controlled power outlet.

3. The method of claim 1 further including provision of means to control a supply of mains electricity to a power supply of the personal computer and operating said means such that when both first and second controlled switches are controlled to be off, the supply of mains electricity is removed from the personal computer power supply.

4. An electrical power supply control device for a personal computer installation including:
    a. a first controlled power outlet adapted for supplying electrical power to a plurality of first devices, said power outlet being controlled by a first switch;
    b. software running on a personal computer adapted to monitor usage of at least one input device of the personal computer;
    c. software running on a personal computer adapted to monitor usage of at least one processor of the personal computer;
    d. software running on a personal computer adapted to monitor a power level mode of the personal computer;
    e. the software being adapted to analyze the results of said monitoring to determine at least one power usage mode of the personal computer; and
    f. means adapted to control the first switch such that when the power usage mode is determined to be such that the first devices are not required to be powered, the first switch is operated to remove power from the first controlled power outlet.

5. The device of claim 4 further including a second controlled power outlet, including a second switch, adapted for supplying electrical power to a plurality of second devices said power outlet being controlled by a second switch means adapted to control the second switch such that when the power usage mode is determined to be such that the second devices are not required to be powered, the second switch is operated to remove power from the second controlled power outlet.

6. The method of claim 4 further including means to control a supply of mains electricity to a power supply of the personal computer said means being operated such that when both first and second controlled switches are controlled to be off, the supply of mains electricity is removed from the personal computer power supply.

* * * * *